(12) United States Patent
Monoi

(10) Patent No.: US 8,939,821 B2
(45) Date of Patent: Jan. 27, 2015

(54) SLIDING DOOR DEVICE

(75) Inventor: Takashi Monoi, Sakura (JP)

(73) Assignee: Keihin Corporation (JP)

( * ) Notice: Subject to any disclaimer, the term of this patent is extended or adjusted under 35 U.S.C. 154(b) by 496 days.

(21) Appl. No.: 13/028,489

(22) Filed: Feb. 16, 2011

(65) Prior Publication Data

US 2011/0197516 A1 Aug. 18, 2011

(30) Foreign Application Priority Data

Feb. 17, 2010 (JP) .................................. 2010-032671

(51) Int. Cl.
*B60H 1/00* (2006.01)
(52) U.S. Cl.
CPC .................................. *B60H 1/00692* (2013.01)
USPC ............................................ 454/69; 165/204
(58) Field of Classification Search
USPC ............................................ 454/69; 165/204
IPC .................................................. B60H 1/00692
See application file for complete search history.

(56) References Cited

U.S. PATENT DOCUMENTS

| 4,915,019 | A | 4/1990 | Hovaguimian |
| 6,305,462 | B1 | 10/2001 | Tsurushima et al. |
| 6,609,563 | B1 * | 8/2003 | Tsurushima et al. ......... 165/204 |

FOREIGN PATENT DOCUMENTS

| CN | 201291732 Y | 8/2009 |
| CN | 101607517 A | 12/2009 |
| EP | 1044832 A2 | 10/2000 |
| EP | 1092572 A2 | 4/2001 |
| JP | 63-502048 A | 8/1988 |
| JP | 63-502048 A | 8/1998 |
| JP | 2009-274708 A | 11/2009 |

OTHER PUBLICATIONS

Machine English translation of the IDS document JP, 2009-274708A.*
Japanese Notice of Reasons for Rejection for Japanese Application No. 2010-032671; Date of Mailing: Aug. 20, 2013; with English Translation.
European Search Report for EP Patent Application No. 11001271 mailed Jun. 10, 2011.
Office Action for the Chinese Patent Application No. 201110066932. 2, dated May 5, 2014. English translation attached.

* cited by examiner

*Primary Examiner* — Steven B McCallister
*Assistant Examiner* — Helena Kosanovic
(74) *Attorney, Agent, or Firm* — Cantor Colburn LLP

(57) ABSTRACT

A sliding door device which a sliding door is inserted into the guide portion in one direction of the sliding direction as an insertion direction upon assembling. A rack gear includes a plurality of standard teeth arranged along the sliding door, and a thick tooth having a larger width, along the sliding door, than those of the standard teeth and being disposed in a left/right symmetrical position with respect to a center in the sliding door. A pinion gear includes a single large tooth groove engaged with the thick tooth, and a short tooth having a length shorter than those of the other teeth while abutting onto a tooth tip of the thick tooth positioned at a rear side of the insertion direction, from among the respective thick teeth.

3 Claims, 3 Drawing Sheets

SLIDING DOOR DEVICE

BACKGROUND OF THE INVENTION

1. Field of the Invention

The present invention relates to a sliding door device. This application claims priority from Japanese Patent Application No. 2010-032671, filed on Feb. 17, 2010, the content of which is incorporated herein by reference.

2. Description of Related Art

In an air conditioner for a vehicle, as a damper device for adjusting the aperture ratio of an opening (opening for heating flow passage and opening for ventilation) through which an air flow cooled by an evaporator passes, a configuration including a sliding door device that slidably moves a sliding door using a rack and pinion scheme is known.

In the air conditioner for a vehicle, the sliding door is housed inside a frame case, and a pair of curved guide grooves for slidably supporting the sliding door is provided inside the frame case.

In addition, in Japanese Unexamined Patent Application, First Publication No. 2009-274708, when assembling the air conditioner for a vehicle, the sliding door provided in the frame case is housed inside the frame case while being slidably moved along the guide grooves by inserting the sliding door in a sliding door-insertion opening.

However, in the sliding door device that slidably moves the sliding door using the rack and pinion scheme described above, as shown in Japanese Unexamined Patent Application, First Publication No. 2009-274708, a pinion gear is engaged with a rack gear formed in the sliding door to thereby be rotatably driven, and thereby the sliding door is slidably moved.

To accurately adjust the position of the sliding door with respect to the rotation angle of the pinion gear, it is necessary to accurately adjust, in advance, the engagement position between the pinion gear and the rack gear in the rotation direction of the pinion gear. For this, in the conventional air conditioner for a vehicle, as shown in Japanese Unexamined Patent Application, First Publication No. 2009-274708, a thick tooth having a width, along the sliding direction, greater than those of other teeth (standard tooth) is provided at one side of the extension direction of the rack gear, and a large tooth groove that is engaged with the thick tooth is provided in the pinion gear. Due to this configuration, the thick tooth is engaged with the large tooth groove when inserting the sliding door into a guide portion, thereby adjusting the engagement position between the pinion gear and the rack gear.

However, in the air conditioner for a vehicle using this configuration, when the thick tooth of the rack gear is not smoothly engaged with the large tooth groove of the pinion gear when inserting the sliding door into the guide portion, the sliding door cannot be securely housed inside the frame case. In this case, it is difficult to engage the pinion gear and the rack gear in the exact engagement position.

In addition, in the conventional air conditioner for a vehicle as shown in Japanese Unexamined Patent Application, First Publication No. 2009-274708, when, during assembly, inserting the sliding door into the guide portion in a direction opposite to the original direction for inserting the sliding door into the guide portion, the sliding door is inserted from a side in which the thick tooth of the rack gear is not present. In this case, in a state in which whether the thick tooth of the rack gear and the large tooth groove of the pinion gear are engaged with each other is not verified, the sliding door is housed inside the frame case. However, when inserting the sliding door into the guide portion in the state in which the pinion gear and the rack gear are not accurately engaged with each other, the thick tooth of the rack gear is thrust into the tooth groove of the pinion gear, and thereby excessive force is exerted on the rack gear and the pinion gear. As a result, a positional deviation between the pinion gear and the rack gear is generated, and thereby the sliding door cannot be accurately slid.

To overcome these problems, when assembling the air conditioner for a vehicle, it is necessary to insert the sliding door to the guide groove in the correct direction in which the sliding door is originally intended to be inserted, based on accurate ascertainment by the operator of the direction of the sliding door. Due to this, an operation for determining the insertion direction of the sliding door is needed each time, causing an increased burden on the operator.

Furthermore, the operation for determining the insertion direction of the sliding door is not only required when assembling the air conditioner for a vehicle, but is also required even when assembling the sliding door device used for devices other than the air conditioner for a vehicle.

SUMMARY OF THE INVENTION

Some aspects of the invention are to provide a sliding door device in which an operation for determining the insertion direction of a sliding door by an operator is not required when assembling the sliding door device, and the burden on the operator is reduced.

[1] According to an aspect of the invention, a sliding door device is provided, including: a frame case that includes an opening through which an air flow passes; a sliding door that is moved relative to the opening along a sliding direction to adjust the aperture ratio of the opening; a guide portion that guides the movement of the sliding door by slidably supporting left and right sides of the sliding door when the sliding door is viewed from the sliding direction; a rack gear that is provided on the sliding door; and a pinion gear that is engaged with the rack gear. In this instance, the sliding door may be inserted into the guide portion in one direction of the sliding direction as an insertion direction when assembling the sliding door device. Also, the rack gear may include a plurality of standard teeth arranged along the sliding direction, and a thick tooth having a larger width, along the sliding direction, than those of the standard teeth and being disposed in a left/right symmetrical position with respect to the center in the sliding direction. Also, the pinion gear may include a single large tooth groove engaged with the thick tooth, and a short tooth having a length shorter than those of the other teeth while abutting a tooth tip of the thick tooth positioned at a rear side of the insertion direction, from among the respective thick teeth.

[2] In the sliding door device described in [1], a tooth tip face of the short tooth may be in surface contact with the tooth tip face of the thick tooth positioned at the rear side of the insertion direction when contacting with the tooth tip face of the thick tooth.

Effects of the Invention

In the sliding door device according to the aspect of [1], the thick tooth on the front side of the insertion direction is engaged with the large tooth groove of the pinion gear even though the sliding door is inserted into the guide portion of the frame case from any direction of its sliding direction when assembling the sliding door device. Due to this, it is possible to accurately adjust the engagement position between the pinion gear and the rack gear, in the rotation direction of the pinion gear. Accordingly, there is no need to specify the insertion direction for inserting the sliding door into the guide portion when assembling the sliding door device. Thus, it is possible to omit the operation for determining the insertion direction of the sliding door by an operator, and to reduce the burden on the operator when assembling the sliding door device.

In addition, according to the aspect, since the pinion gear has the short tooth, even though the short tooth abuts the thick tooth of the rack gear to be moved onto the thick tooth, it is possible to suppress the degree to which the short tooth and the thick tooth are pushed away from each other by the length of the short tooth. Thus, it is possible to prevent positional deviation or disengagement due to excessive force exerted on the rack gear and the pinion gear.

In addition, in the case of [2], the tooth tip face of the short tooth is in surface contact with the tooth tip face of the thick tooth, so that a force is exerted locally on the short tooth and the thick tooth, thereby preventing breakage of the pinion and rack gears.

DETAILED DESCRIPTION OF THE INVENTION

Figure 1:
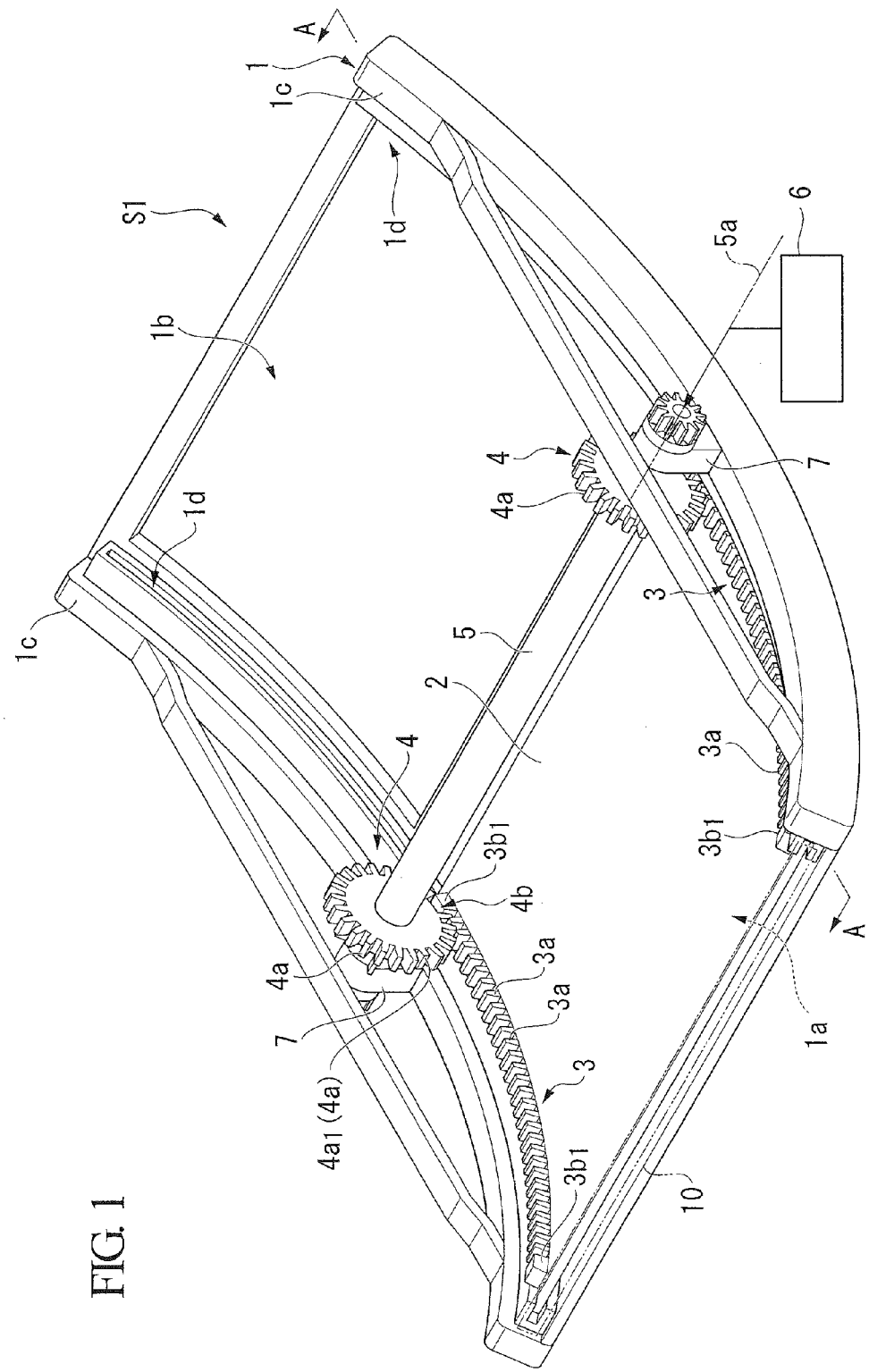
FIG. 1 is a perspective view showing a schematic configuration of a sliding door device according to an embodiment of the present invention.

Hereinafter, a sliding door device according to an embodiment of the present invention will be described with reference to the accompanying drawings. Further, the scale of each member is changed as appropriate in order to have a recognizable size in the drawings described below.

In addition, in the following description, an example in which a sliding door device according to an embodiment of the present invention is applied to an air-mix damper device mounted in an air conditioner for a vehicle will be described. However, the present invention is not limited thereto, and may be applied to other sliding door devices provided with a sliding door. That is, the present invention may be applied to a mode damper device for adjusting the aperture ratio of an outlet of the air conditioner for a vehicle or an inside/outside air switching damper for controlling opening and closing for the purpose of inside/outside air switching through a discharge port of a blower. In addition, the present invention may be applied to the sliding door device other than the air conditioner for a vehicle.

The air-mix damper device S1 (sliding door device) according to an embodiment (see FIG. 1) is mounted in a heating ventilation air conditioning (HVAC) formed into a unit, and is housed inside a heater case in which a heater core or an evaporator is housed.

In addition, the sliding door device S1 adjusts the supply flow rate to a heating flow passage of cold air supplied from the evaporator, and thereby the mixing ratio between warm air heated in the heating flow passage and cold air ventilated directly to a mixing unit may be adjusted.

FIG. 1 is a perspective view showing a schematic configuration of a sliding door device according to an embodiment of the present invention.

As shown in FIG. 1, the sliding door device S1 according to the embodiment includes a frame case 1, an air-mix damper 2 (sliding door), a rack gear 3, a pinion gear 4, a shaft 5, and a driving device 6.

The frame case 1 is fixed to the heater case. In the frame case 1, a heating flow passage opening 1a (opening) communicated with the heating flow passage and a ventilation opening 1b (opening) for ventilating cold air to the mixing unit without passing through the heating flow passage are provided. The cold air (air flow) supplied from the evaporator passes these openings (the heating flow passage opening 1a and the ventilation opening 1b).

In addition, in the frame case 1, a support wall 1c is erected in both sides of the heating flow passage opening 1a and the ventilation opening 1b. The support wall 1c supports a bearing for pivotably supporting the shaft 5. Furthermore, when the sliding door device S1 is actually mounted in the air conditioner for a vehicle, the frame case 1 may be configured as a part of a case included in the air conditioner for a vehicle.

In addition, a guide groove 1d for guiding the air-mix damper 2 (sliding door) is provided in the frame case 1. The guide groove 1d is formed on the support wall 1c as a groove, and has a curved-shape.

In addition, as shown in FIG. 1, in the case of the air conditioner for a vehicle, an insertion hole 10 communicated with the guide groove 1d is formed. When assembling the air conditioner for a vehicle (that is, when assembling the sliding door device S1 according to the invention), the sliding door 2 is inserted into the insertion hole 10.

The sliding door 2 has a curved plate shape, and a size capable of closing the heating flow passage opening 1a and the ventilation opening 1b. In addition, both left and right sides of the sliding door 2 when viewed along the sliding direction are slidably fitted on the guide groove 1d (guide portion). The sliding door 2 is slidably moved along the shape of the guide groove 1d by receiving force from the rack gear 3 and the pinion gear 4.

The rack gear 3 is provided on both ends of the sliding door 2 in such a manner as to be integrally formed with the sliding door 2, as shown in FIG. 1. In addition, the rack gear 3 extends along the sliding direction.

The pinion gear 4 is a gear engaged with the rack gear 3, and fixed to the shaft 5. The pinion gear 4 is rotated by the shaft 5, and functions as a drive gear of the rack gear 3.

Figure 2:
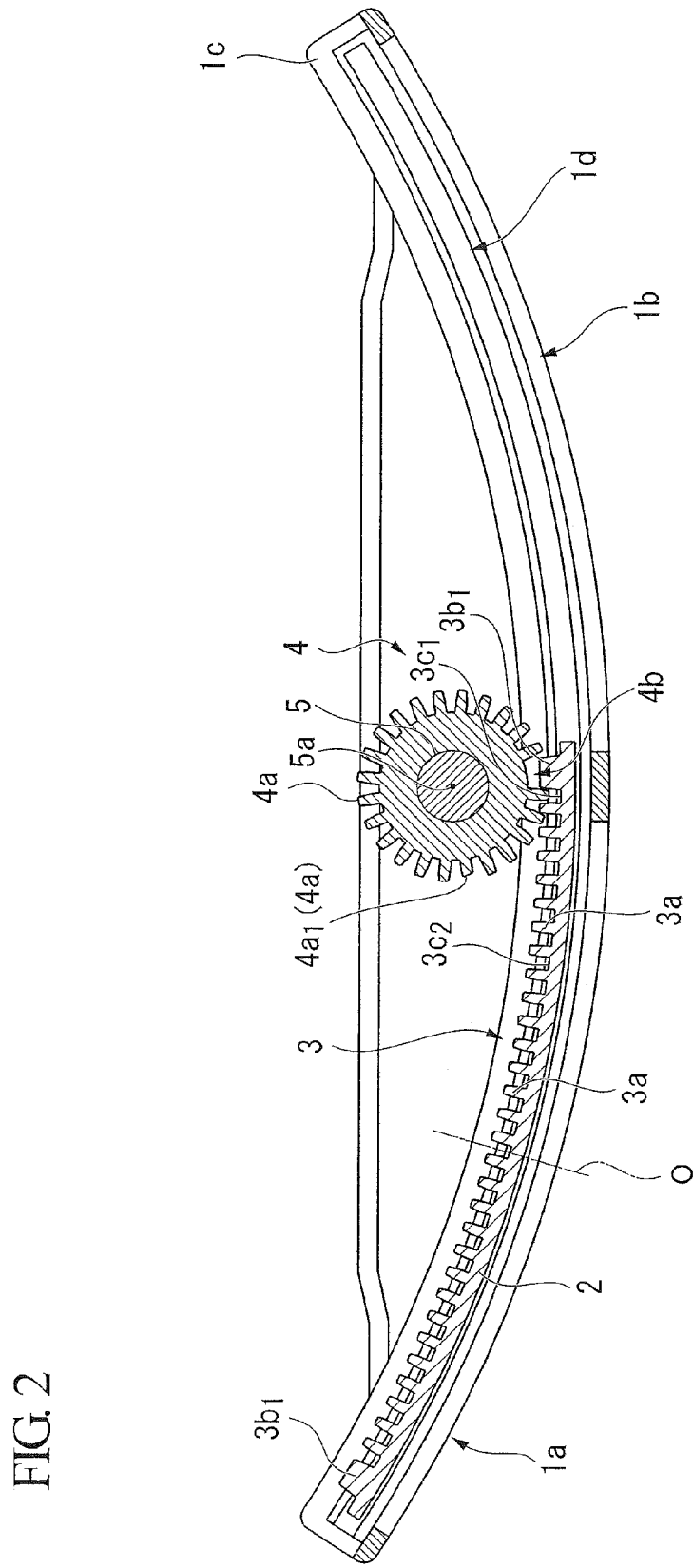
FIG. 2 is a cross-sectional view obtained when the sliding door device is viewed from the A-A line of FIG. 1.

FIG. 2 is a schematic view showing the sliding door device including a pair of rack gears 3 and a pinion gear 4. As shown in FIG. 2, the rack gear 3 includes a plurality of standard teeth $3a$ arranged in the sliding direction of the sliding door 2 and a thick tooth $3b_1$ having a width, along the sliding direction, greater than those of the standard teeth $3a$.

In each of the rack gears 3, the thick teeth $3b_1$ are disposed one by one in a left/right symmetrical position with respect to a center O in the sliding door direction of the sliding door 2, and the plurality of standard teeth $3a$ are arranged between the thick teeth $3b_1$.

Furthermore, in the sliding door device S1 according to the embodiment, the thick tooth $3b_1$ is disposed at both ends of the rack gear 3, and has a shape obtained by burying two adjacent standard teeth $3a$ and a tooth groove between the two adjacent standard teeth $3a$. In addition, a gap of a tooth groove $3c_1$ between the thick tooth $3b_1$ and the standard teeth $3a$ adjacent to the thick tooth $3b_1$ is equal to a gap of a tooth groove $3c_2$ between the adjacent standard teeth $3a$.

The pinion gear 4 is fixed to the shaft 5, and is a gear in which a plurality of teeth $4a$ for being engaged with the tooth grooves $3c_1$ and $3c_2$ of the rack gear 3 is arranged in the circumferential direction. As shown in FIG. 2, a large tooth groove $4b$ engaged with the thick tooth $3b_1$ of the rack gear 3 is provided at only one point of the pinion gear 4.

Further, the large tooth groove $4b$ is formed by removing one of the teeth $4a$ of the pinion gear 4. Due to this, even though the pinion gear 4 is rotated, the large tooth groove $4b$ smoothly passes through above the standard teeth $3a$ without being engaged with a portion (standard teeth $3a$) other than the thick tooth $3b_1$ of the rack gear 3.

In addition, when rotatably driving the pinion gear 4 so that the sliding door 2 is moved in a direction of closing the ventilation opening $1b$ in a state (state shown in FIGS. 1 and 2) where the thick tooth $3b_1$ of a side (distal end side of the insertion direction) of the rack gear 3 is engaged with the large tooth groove $4b$ of the pinion gear 4, the rack gear 3 is slidably moved to one side of the sliding door 2. Next, the sliding door 2 is stopped by a stopper (not shown), around an area completely closing the ventilation opening $1b$, before the thick tooth $3b_1$ formed in the other side (rear side of the insertion direction) of the rack gear 3 abuts onto the pinion gear 4.

Figure 3:
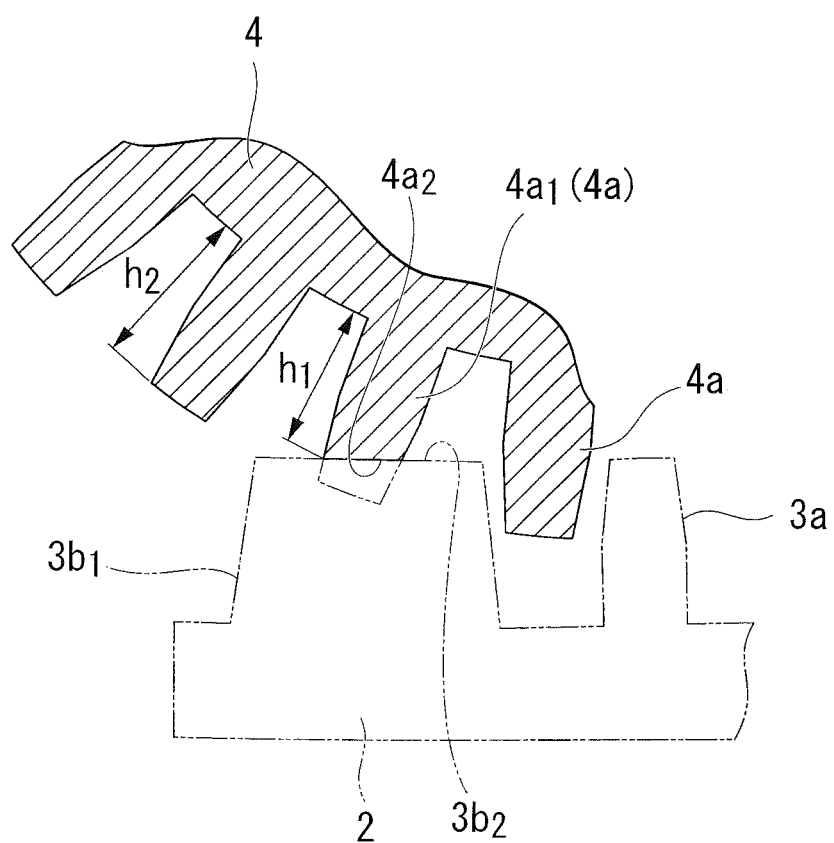
FIG. 3 is a cross-sectional view obtained by enlarging a portion including a short tooth of a pinion gear included in the sliding door device.

FIG. 3 is a cross-sectional view obtained by partially enlarging the pinion gear 4 when the sliding door 2 is moved until the teeth $4a$ of the pinion gear 4 abuts onto the thick tooth $3b_1$ of the other side due to reasons such as variations in tolerance dimensions, defects in the stopper, or the like. In the pinion gear 4 of the sliding door device S1 according to the embodiment, the length dimension of the tooth $4a_1$ (hereinafter, referred to as a short tooth $4a_1$) on which the tooth tip of the thick tooth $3b_1$ abuts is set to be shorter than those of other teeth $4a$ in the case shown in FIG. 3.

In addition, a tooth tip face $4a_2$ of the short tooth $4a_1$ is in surface contact with a tooth tip face $3b_2$ of the thick tooth $3b_1$ when contacting with the thick tooth $3b_1$ of the other side of the pinion gear. Consequently, as shown in FIG. 3, so that the tooth tip face $4a_2$ of the short tooth $4a_1$ is in surface contact with the tooth tip face $3b_2$ of the thick tooth $3b_1$ of the rear side of the insertion direction, an angle of the tooth tip face $4a_2$ of the short tooth $4a_1$ is set to be an inclined face.

Referring again to FIG. 1, the pinion gear 4 is fixed to both ends of the shaft 5, and is pivotably supported by the bearing 7 attached to the support wall $1c$.

The driving device 6 (for example, motor) is connected to the shaft 5. The shaft 5 is rotatably driven due to a power source transmitted from the driving device 6.

In the sliding door device S1 according to the embodiment, when the shaft 5 is rotatably driven by the motor (not shown), the pinion gear 4 is rotated by the rotation of the shaft 5. Due to this, the rack gear 3 is slidably moved along the sliding direction, and the sliding door 2 is slidably moved between a position of completely closing only the heating flow passage opening $1a$ and a position of completely closing only the ventilation opening $1b$.

In addition, a rotating direction and a rotating quantity of the pinion gear 4 is controlled by a control device (not shown), and thereby a sliding position of the sliding door 2 is controlled. As a result, the aperture ratio of the heating flow passage opening $1a$ and the ventilation opening $1b$ which are closed by the sliding door 2 is controlled, and a mixing ratio of cold air (cold air ventilated to the mixing unit without passing through the heating flow passage) and warm air (cold air heated by the heating flow passage) is adjusted.

In addition, when assembling the sliding door device S1 according to the embodiment (that is, when assembling the air conditioner for a vehicle equipped with the sliding door device S1), the sliding door 2 is inserted in one direction of the sliding direction of the sliding door 2 as the insertion direction from the insertion hole 10 shown in FIG. 1, with respect to the frame case 1 assembled in advance, and thereby the sliding door 2 is inserted into the guide groove $1d$.

Here, since the thick teeth $3b_1$ are disposed one by one in the left/right symmetrical position with respect to the center O of the rack gear 3, the thick tooth $3b_1$ formed in the front side of the insertion direction is engaged with the large tooth groove $4b$ of the pinion gear 4 even when the sliding door 2 is inserted into the guide groove $1d$ in any direction of the sliding direction of the sliding door 2. Due to this, when assembling the sliding door device S1, the positional relationship between the rack gear 3 and the pinion gear 4 is the same every time. Consequently, when assembling the sliding door device S1, the sliding door 2 is accurately and smoothly positioned with respect to the pinion gear 4 without specifying the insertion direction of the sliding door 2 to the guide groove $1d$. Accordingly, it is possible to reduce workload when assembling the sliding door device S1.

In addition, the length dimension of the tooth $4a_1$ (short tooth) of the pinion gear 4 that abuts onto the tooth tip face $3b_2$ of the thick tooth $3b_1$ in any direction of the rear side of the insertion direction among the respective thick teeth $3b_1$ is set to be shorter than those of the teeth $4a$ of another pinion gear 4. Due to this, around an area in which the sliding door 2 completely closes the ventilation opening $1b$, even though the short tooth $4a_1$ abuts onto the thick tooth $3b_1$ or moves onto the thick tooth $3b_1$ by variations of tolerance dimensions and defects in the stopper, it is possible to suppress the degree to which the short tooth $4a_1$ and the thick tooth $3b_1$ are pushed away from each other by the length of the short tooth $4a_1$. Thus, it is possible to prevent positional deviation or disengagement due to excessive force exerted on the rack gear 3 and the pinion gear 4.

Since the short tooth $4a_1$ has a length shorter than that of the teeth $4a$ of another pinion gear 4, the short tooth $4a_i$ is engaged with the tooth groove $3c_2$ of the rack gear 3, similarly to other teeth $4a$. Due to this, disengagement between the rack gear 3 and the pinion gear 4 is not generated, and there are no effects on the transmission of a driving force to the rack gear 3.

Meanwhile, when the short tooth $4a_1$ is completely absent, the large tooth groove having the same width as that of the large tooth groove $4b$ is formed at a position where the short tooth $4a_1$ of the pinion gear 4 is provided. Due to this, when inserting the sliding door 2 to the guide groove $1d$, the positional relationship between the rack gear 3 and the pinion gear 4 may be deviated. In addition, the transmission of the driving force to the rack gear 3 may be affected by a reduction in a number of the teeth $4a$ of the pinion gear 4.

In addition, in the sliding door device S1 according to the embodiment, the tooth tip $4a_2$ of tooth (short tooth $4a_1$) of the pinion gear 4 on which the tooth tip of the thick tooth $3b_1$ abuts is set at an angle to be in surface contact with the tooth tip face $3b_2$ of the thick tooth $3b_1$. Due to this, when the short tooth $4a_1$ abuts onto the thick tooth $3b_1$, it is possible to reduce stress locally exerted on the short tooth $4a_1$ and the thick tooth $3b_1$. As a result, it is possible to prevent breakage or deterioration of the short tooth $4a_1$ and the thick tooth $3b_1$.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In the above described embodiment, a configuration in which the thick tooth $3b_1$ is disposed in both ends of the rack gear 3 has been described.

However, the present invention is not limited thereto, and a configuration in which the short tooth $4a_1$ passes through the thick tooth $3b_1$ while the thick tooth $3b_1$ is not disposed at both ends of the rack gear 3 may be adopted. However, even in this case, it is necessary that the thick tooth $3b_1$ is disposed in the left/right symmetrical position with respect to the center O in the sliding direction of the sliding door 2.

In addition, in the above described embodiment, a configuration in which the tooth tip face $4a_2$ of the short tooth $4a_1$ is set at an angle to be in surface contact with the tooth tip face $3b_2$ of the thick tooth $3b_1$ has been described. However, the shape of the tooth tip face $4a_2$ of the present invention is not limited thereto. The shape of the tooth tip face $4a_2$ of the short tooth $4a_1$ may be changed as long as the tooth tip face $4a_2$ of the short tooth $4a_1$ is capable of contacting with the tooth tip face $3b_2$ of the thick tooth $3b_1$.

What is claimed is:

1. A sliding door device, comprising:
   a frame case that includes an opening through which an air flow passes;
   a sliding door that is moved relative to the opening along a sliding direction to adjust an aperture ratio of the opening;
   a guide portion that guides a movement of the sliding door by slidably supporting left and right sides of the sliding door when the sliding door is viewed from the sliding direction;
   a rack gear that is provided in the sliding door; and
   a pinion gear that is engaged with the rack gear, wherein
   the sliding door is inserted into the guide portion in one direction of the sliding direction as an insertion direction when assembling the sliding door device;
   the rack gear includes
      a plurality of standard teeth arranged along the sliding door, and
      a plurality of thick teeth having a larger width, along the sliding door, than those of the standard teeth and being disposed at both ends of the rack gear and being formed by burying two adjacent standard teeth and a tooth groove between the two adjacent standard teeth; and
   the pinion gear includes
      a single large tooth groove engaged with the thick tooth and formed by removing one of the teeth of the pinion gear, and
      a short tooth having a length shorter than those of the other teeth and abutting onto a tooth tip of the thick tooth positioned at a rear side of the insertion direction, from among the respective thick teeth.

2. The sliding door according to claim 1, wherein a tooth tip face of the short tooth is in surface contact with a tooth tip face of the thick tooth positioned at the rear side of the insertion direction when contacting with the tooth tip face of the thick tooth.

3. The sliding door device according to claim 1, wherein only one short tooth is formed therein.

\* \* \* \* \*